(12) United States Patent
Tam

(10) Patent No.: US 6,968,457 B2
(45) Date of Patent: Nov. 22, 2005

(54) METHOD FOR MAKING SECURED PERSONAL IDENTITY CARD AND PROCEDURES FOR VALIDATION AND OBTAINING SECURE PERSONAL INFORMATION

(76) Inventor: Joseph Wing On Tam, Flat 1B, Block 12 Chi Fu Fa Yuen, Hong Kong (HK)

( * ) Notice: Subject to any disclaimer, the term of this patent is extended or adjusted under 35 U.S.C. 154(b) by 802 days.

(21) Appl. No.: 09/822,801

(22) Filed: Mar. 30, 2001

(65) Prior Publication Data

US 2001/0054154 A1    Dec. 20, 2001

Related U.S. Application Data

(60) Provisional application No. 60/193,950, filed on Mar. 31, 2000.

(51) Int. Cl.[7] ............................................. H04L 9/00
(52) U.S. Cl. ..................... 713/186; 713/200; 235/380
(58) Field of Search ............................. 713/200, 184, 713/186; 705/65–67; 235/380

(56) References Cited

U.S. PATENT DOCUMENTS

| | | | | |
|---|---|---|---|---|
| 5,559,885 A | * | 9/1996 | Drexler et al. | 235/380 |
| 5,563,395 A | * | 10/1996 | Hoshino | 235/380 |
| 6,163,272 A | * | 12/2000 | Goode et al. | 725/30 |
| 6,325,292 B1 | * | 12/2001 | Sehr | 235/492 |
| 6,591,249 B2 | * | 7/2003 | Zoka | 705/18 |
| 2001/0018660 A1 | * | 8/2001 | Sehr | 705/5 |

* cited by examiner

*Primary Examiner*—Matthew Smithers
*Assistant Examiner*—Minh Dieu Nguyen
(74) *Attorney, Agent, or Firm*—Raymond Y. Chan; David and Raymond

(57) ABSTRACT

A method for making a secured personal identity card and procedures for validation and obtaining secure personal information includes the steps of (a) collecting a set of personal information from a user into an identity file wherein the identity file includes at least one section; (b) receiving an inputting personal identification number ("PIN"); and (c) comparing the inputting PIN with a master PIN preset in the identity file. Therefore, the user selectively and securely releases only specific information based upon the inputting PIN as compared to the biographical information guarded by the master PIN.

19 Claims, 2 Drawing Sheets

METHOD FOR MAKING SECURED PERSONAL IDENTITY CARD AND PROCEDURES FOR VALIDATION AND OBTAINING SECURE PERSONAL INFORMATION

CROSS REFERENCE

This is a regular application of a provisional application, application No. 60/193,950, filed on Mar. 31, 2000.

BACKGROUND OF THE PRESENT INVENTION

1. Field of Invention

The present invention relates to method of making an identity card, and more particularly to a method for making a secured personal identity card and procedures for validation and obtaining secure personal information, including medical and/or DNA data, which can precisely distinguish an individual's identification and securely protect the privacy of the individual.

2. Description of Related Arts

Nowadays, an identity card is commonly used in order to identity ourselves. The identity card which contains personal information is easy to be stolen and used since the procedure of verification of the identity is simple and not secured. Usually, the identity card has a predetermined PIN as a password containing different combinations of numbers is provided for a user to identity himself or herself. The identity card contains the user's general personal data, such as his/her name, photo or blood type, that is easy to be duplicated or modified.

In order to verify the user identification, the predetermined PIN is usually used such that an input PIN is matched to the predetermined PIN preset in the identity card. However, the PIN can be stolen easily by releasing it to someone or decoded by the computer. So, someone can enter our lives without permission by using our personal information and, worse, our personal information may get changed and we may get in trouble by someone inputting any unwanted data into the identity card. In such conditions, people may lack security of the society.

SUMMARY OF THE PRESENT INVENTION

A main object of the present invention is to provide a method for making a secured personal identity card and procedures for validation and obtaining secure personal information, including medical and/or DNA data, wherein the identity of the individual is secured since the verification requires personal information, such as fingerprints, that is unique and cannot be copied and replaced.

Another object of the present invention is to provide a method for making a secured personal identity card and procedures for validation and obtaining secure personal information, including medical and/or DNA data, wherein additional security can be added to guard against the forced entry such that various biometrics information can be used for different transactions or difference levels of security.

Another object of the present invention is to provide a method for making a secured personal identity card and procedures for validation and obtaining secure personal information, including medical and/or DNA data, which can be used to guarantee personal privacy. By using selective information such as PIN or biometrics information, an individual can protect his/her name or photo or other chosen information concerning his/her identity from others when dealing with his/her confidential subject matter. For example, when the identity card holder requests a DNA test for AIDS, he/she can give the PIN number to the laboratory for testing AIDS and then open his/her section of the identity file that only contains information according to his/her DNA data. Furthermore, the identity card holder can give instructions about the directory that he/she wants to store the new testing data without releasing the unwanted information. The people in the laboratory will not know whose DNA and whose file number (PIN) correspond to this sample. The activation procedure in this example can be as simple as taking a fingerprint in a recording device that provides the password.

Another object of the present invention is to provide a method for making a secured personal identity card and procedures for validation and obtaining secure personal information, including medical and/or DNA data, wherein the unique personal biometrics information is used such that the authenticity is guaranteed.

Another object of the present invention is to provide a method for making a secured personal identity card and procedures for validation and obtaining secure personal information, including medical and/or DNA data, wherein data at the lowest level of security such as name, sex, and age can be made available for general purpose or for community population statistical analysis, daily information etc without breathing the privacy act. These data can be stored in the section of the identity file that are deemed by society as non-critical will be released to the government or anyone deemed necessary without the need of an activation procedure of the file by the individual concerned. For example, the information in such section may contain an ID number or Social Security number that issued by the government.

Accordingly, the information contained in an identity card for a person forms an identity file that consists of the name, the photo, the signature, as well as biometrics information such as the fingerprint, the iris pattern and possibly more detailed information on the DNA sample from the person. This file can be compressed and be given a code, used as the PIN for the individual to whom the information belongs. When the information is required for the verification of the identity of this person, he/she must provide the PIN as well as taking certain specific procedures, such as having his/her fingerprint taken, in order to activate the decoding process of the file. Thus, even if someone knows the PIN, the privacy of the individual is protected unless he/she cooperates by providing the biometrics information.

This has several advantages compared to existing identity cards. First of all, the identity of the individual is secured unless he/she cooperates by following specific procedure of opening up the file for verification. Different procedures correspond to different sections of the file to be opened.

For example, how can an individual protect his/her name or photo or other chosen information concerning his/her identity from others while requesting a DNA test for AIDS? We provide the following method. He/she can first give the PIN number to the laboratory for testing AIDS and then activate the opening procedure of his/her identity file the section that contains ONLY his/her DNA information. The people in the laboratory will not know whose DNA and whose file number (PIN) correspond to this sample.

The activation procedure in this example can be as simple as taking a fingerprint in a recording device that provides the password. Testing of relationship between parents and child can also be made in a similar way, provided that all three parties involved activate the DNA section of the corresponding files and authorize the laboratory to read in the data and perform the DNA diagnostic test on the relationship.

However, the laboratory technicians will only see a set of three PIN's and three DNA data files, without any knowledge or ability or authority to identify the individuals corresponding to these files. There will also be no 'big brother' in the government in the sense that only those sections of the identity file that are deemed by society as noncritical will be released to the government without the need of an activation procedure of the file by the individual concerned.

For example, this can be a section that is contained in present day ID card or Social Security Card issued by the government. The method of making the identity file and the procedures for activation and verification are described in details below, with many practical applications afterwards.

The following items are the distinctive features according to the present invention:

1. Methodology of data Collection for the identity file 1.1 The identity file consists of a number (n) of sections. Each section contains a particular class of information that can be used to identify the person.

The following classes are to be included:

1.1.1 Basic information appearing in existing identification card. This usually contains the name, the birthday, as well as some basic numbers such as social security number in USA, passport records . . . etc. This class of information can be made available under local laws and upon request from the government.

1.1.2 Simple biometrics information that is standard, such as color of hair, eyes, and recent photograph.

1.1.3 Simple biometrics information that is less standard, such as iris pattern, fingerprints, and hand prints.

1.1.4 Standard biometrics information that is related to the medical record of the person.

1.1.5 DNA fingerprint and other such information of the person 1.1.6 Voice recording of the person of a selection of standard messages.

1.1.7 Any other records deem important to the person who wishes to put in.

1.1.8 In the cases of the need of authentic sampling such as Human ID testing. Sampling procedure can also be securely monitored, with the help of the third party such as Notary Public or Attorney; the use of real time internet recording and sending of data for testing. (you can think of new classes here.)

1.2 Using existing multimedia data management, the sections of 1.1 are to be converted into standard files with appropriate file types.

1.3 Using a selection of data compression techniques, each section files is to be compressed and a header is added to form the PIN number for that section. The header, which is the PIN number of an individual section, consists of five pieces of information:

1.3.1 The section identification number to be assigned based on a random number generator. The range of the section identification number can be fixed to run from 00 to 99, if there are not more than 100 sections in the identity file.

1.3.2 In order to classify the level of confidentiality of the section, a digit is appended onto the section identification number. For example, when there are three levels of confidentiality, the digit can be 1, 2, and 3. If the section is not confidential, the digit 0 is assigned.

1.3.3 The method of data compression, chosen from a selection of methods using a random number generator. This can be an integer.

1.3.4 The file type from a selection of types using a second random number generator. This is the second integer.

1.3.5 An integer to denote the status of the section.

For example, if the section file is non-confidential, then we denote it with 0. If the section is confidential, it is given a nonzero integer. To give a simple example, let there be only three modes of biometrics information considered, namely fingerprint, iris pattern and voice recording. We can order them from 1 to 3, with 1 corresponding to fingerprint, 2 for iris pattern, and 3 for voice recording. (Example 1: the section header (or section PIN ) for 120520 means that this is the 12 section, of level of confidentiality 0, compressed with method 5, and of file type 2, and is of non-confidential status.

Example 2: the section header for 022331 means that this is the 02 section of level of confidentiality 2, compressed with method 3, and of file type 3, and required the fingerprint to open this file.)

1.4 A special section called the K section, contains the encrypted data corresponding to the biometrics information used in the authorization process. In the above example, this K section contains the fingerprints, the iris pattern and voice recording. This section requires the use of public key encryption technology for its opening. The public key is also used as the personal password for the entire identity file. When K section is opened, one cannot view the information inside, but can compare overlap of information input with the stored information in K section. Therefore, K section will be used for verification purpose of biometrics information only.

1.5 The entire collection of section files, with their corresponding PIN's, form the encrypted code for the identity file. The PIN for the entire identity file is formed using the following procedure.

1.5.1 For the given n sections of the identity file, choose a random number generator to generate a sequence of n digits to denote the ordering of the sections. This sequence of n digits, denoted by X, forms the master PIN number for the entire identity file. X is to be remembered by the identity card holder.

1.5.2 An image sequence of n digits, denoted by Y, is to follow X. Y contains the mode of biometrics information for the corresponding section in X.

1.5.3 The entire identity card number will be denoted by XY and a bracket ( ), which value consists of two digits to be keyed in by the identity card holder.

(For example, consider that there are 5 sections of the entire identity card. X can then be 43152. This identity card number means that the section ordering is first the fourth section, then the third section, then the first section, then the fifth section and then the second section. Supposing that we have section 1 as non-confidential, section 2, 3, and 4 are confidential and requires respectively the supply of biometrics information of the fingerprint, the iris pattern and again the fingerprint for the opening of the section, and finally section 5 is non-confidential. Then the corresponding Y is 01210. The PIN number of this identity file is 4315201210. If the bracket ( ) contains the digits 03, then the identity cardholder wants to open up section 3.)

1.5.4 One can also use other method for the coding of X. The main idea is that X is some password that is used to open the identity file using public key. The opening of the identity file consists of the following two features: (1) the non-confidential section can be opened. (2) the K section is opened not for viewing, but only for the verification purpose of other confidential sections.

The following introduces a method of activation of a section of the identity file. The activation process of a section file is defined to be the authorization process of opening a file after the verification of the PIN of that entire identity file.

2.1 The verification of the PIN of the entire identity file consists of the following steps:

2.1.1 The identity card holder will key in his/her PIN number for the entire file, excluding the last two digits in bracket. If the PIN is correct, then the cardholder will be authorized to proceed further.

2.1.2 The last two digits are to be supplied by the identity card holder to indicate which section file is to be opened.

2.1.3 If the section file does not require a key to be opened, (as indicated in 1.3.4), then the section file will be opened.

2.1.4 If the section file requires a key to be opened, then the cardholder must supply the appropriate biometrics information to open the section file. In the above example, when section 3 is to be opened, the cardholder must provide his/her iris pattern. When the cardholder provides the correct iris pattern that matched the K section of the identity file, section 3 will be opened.

2.2 Information released consists of the opened section files and the file number of the identity card. Therefore, there is complete privacy unless there is a release of both the personal file containing the name, photographs etc of the person and the confidential section. This can be prevented by a security procedure discussed in 3.

3. Applications and security of the identity card The identity card holder has the freedom to release his personal identity including his confidential section files by supplying the correct PIN as well as the appropriate biometrics information. However, there is always a protection from threatening situation where the person is forced to release all section information, while an emergency signal is sent simultaneously to destined location for help. This is achieved by a particular combination of biometrics information. For example, if the K section is to be opened under normal situation, i.e., not under threat, then the cardholder will supply his fingerprints of the thumb and the index finger. On the other hand, if the cardholder is under threat, how can he/she comply with the threatening party and send a distress signal to a helping party simultaneously? In this situation, the cardholder can supply the finger print of his thumb which will authorize the opening of the appropriate section by checking the K section, as well as the finger print of his little finger. Which particular choice of fingers to be used by the cardholder is only known to the cardholder. As a result, the threatening party will have no way to know whether a distress signal has been sent, because in both cases, the finger print of the thumb already authorize the opening of the appropriate confidential section. The full protection of the information in the identity file is provided by the definition of the corresponding modes of biometrics information for the sections and the memorization of these modes by the identity cardholder. In the above example, the code Y must be memorized in addition to the meaning of 1 for fingerprint, 2 for iris pattern and 3 for voice recording. Furthermore, in order to have the ability to send signals for help, a special fingerprint, for example the little fingerprint, must be remembered as a mode for the sending of distress signal.

4. Example of operation 4.1 General operation

First, the identity card holder will have his personal information taken as defined in section 1.

Next, he will have to choose the mode of biometrics information for verification. For example, he will decide that he only use fingerprints and iris pattern. He should also decide at the same time the mode of distress signal. For example, he will use the right thumb and the left thumb for normal opening of a confidential section, but will use the right thumb and right index finger for the opening of the confidential section while sending a signal for help to the police. This decision must be memorized.

Finally, he will designate which section file will be confidential, and if so, what is the mode of biometrics information required for its opening. He will form the PIN of his identity card by providing X and Y. Y is used as a string of reminder for the mode of biometrics information required for the opening of the confidential section. An outsider will not be able to interpret the mode even if the outsider understands the method of PIN generation.

4.2 Secure and authentic sampling for personal bio-testing (e.g. blood, urine etc. including DNA)

In the case of forensic or paternal DNA identification, the authenticity of the sample must be absolutely certain. Using the above scheme and the real time internet communication, the processes of sampling and transportation can be made securely. The person to be tested can activate his own file. The sample taking process is recorded with a video-equipped computer. His personal ID encripted data (or bar code) is placed onto the sample. If testing must be done in another laboratory, the sampling (video recording process, etc.) data is immediately transmitted to his personal data file and only the required information is sent to the testing center. The results will be automatically recorded into his data file only with the given encripted ID without revealing his real personal information so that absolute privacy is ensured. If required, he will then activate his file accordingly for whatever purpose he desires OR is required by proper authority upon his cooperation. This procedures will then ensure the authenticity. Utilizing the internet this can be done anywhere else.

DETAILED DESCRIPTION OF THE PREFERRED EMBODIMENT

Figure 1:
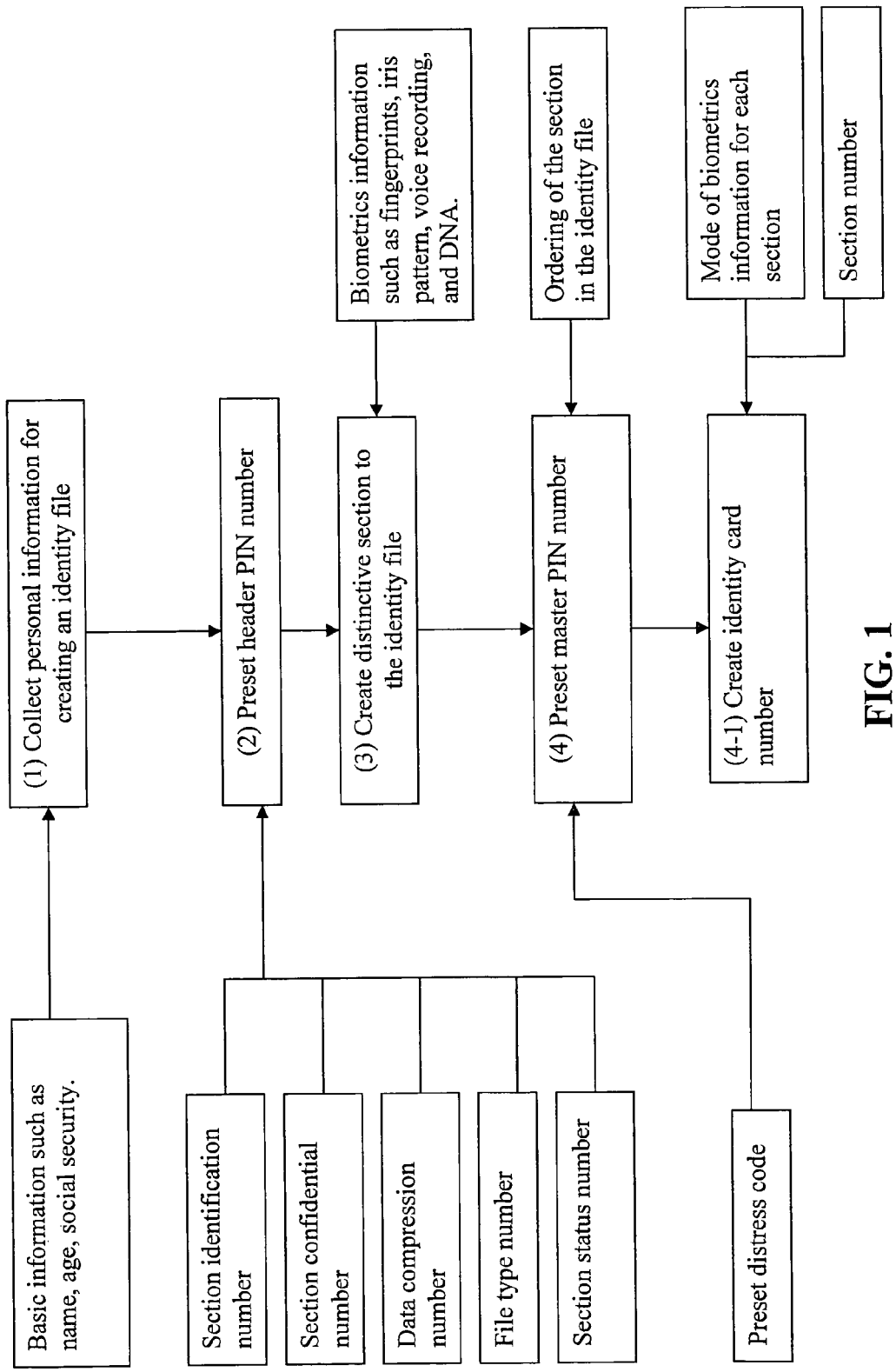
FIG. 1 is a block diagram of a method for making a secured personal identity card according to a preferred embodiment of the present invention.
Figure 2:
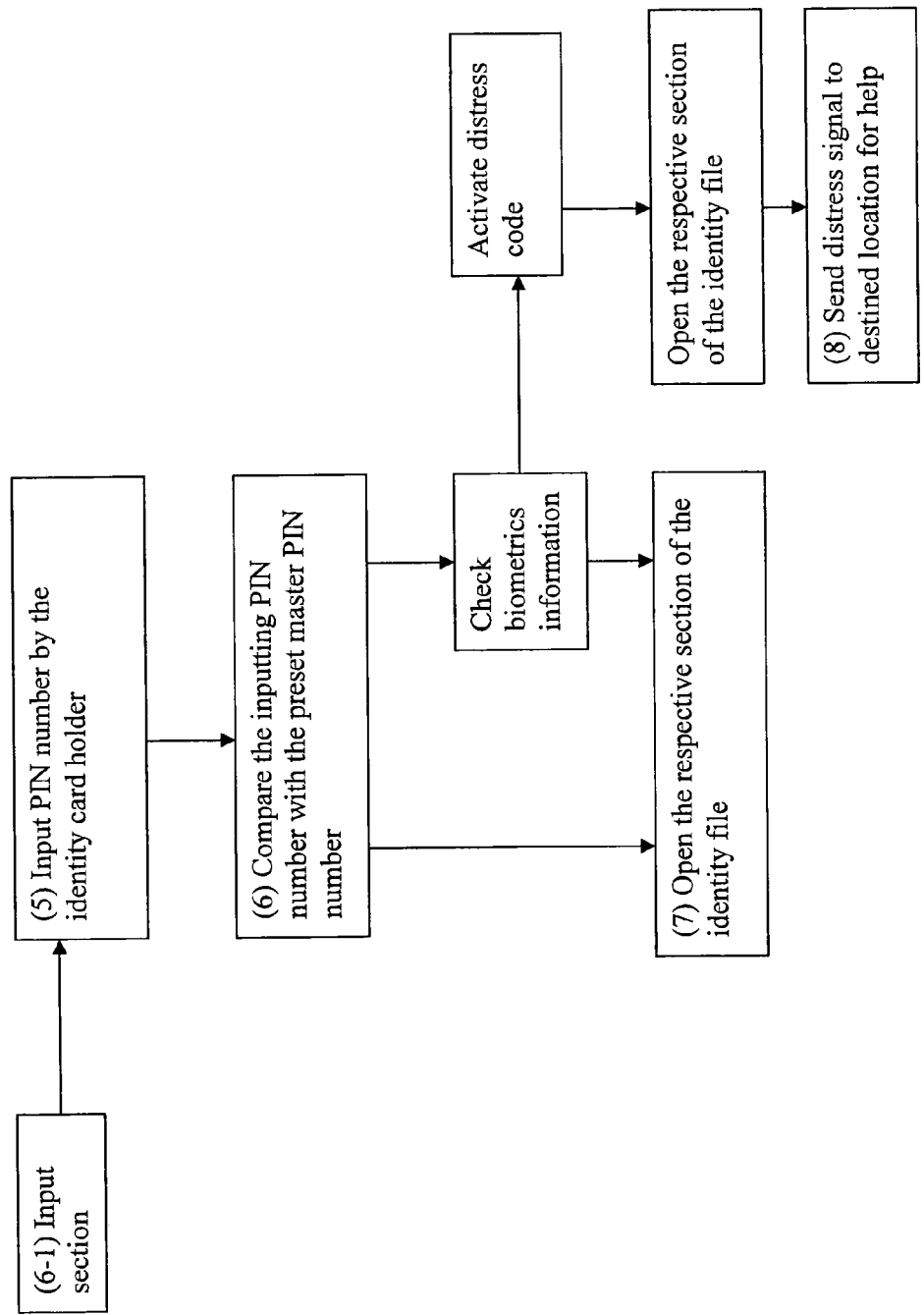
FIG. 2 is a block diagram of procedures for validation and obtaining secure personal information according to the above preferred embodiment of the present invention.

Referring to FIGS. 1 and 2 of the drawings, the present invention provides a method for making secured personal identity card and procedures for validation and obtaining secure personal information, including medical and/or DNA data, are illustrated, which comprises the steps of making secured personal identity card and the steps of validation and obtaining secure personal information, wherein the steps of making secured personal identity card, as shown in FIG. 1, as follows:

(1) Collect personal information for creating an identity file wherein the identity file comprises a plurality of sections each comprising a particular class of information that adapted to be used to identity a person selectively.

(2) Preset a header PIN number for each section for representing the header of each section wherein each header PIN number comprises a section identification number, a section confidential number, a data compression number, a file type number, and a section status number.

(3) Create a distinctive section comprising an encrypted data corresponding to biometrics information used in an authorization process.

(4) Preset a master PIN number for the identity file wherein the master PIN number comprises an ordering of the sections.

The steps of validation and obtaining secure personal information, as shown in FIG. 2, as follows:

(5) Input a PIN number by an identity card holder.

(6) Compare the inputting PIN number with the preset master PIN number.

(7) Open a respective section of the identity file indicated in the input PIN number.

In step (1), the personal information collected from a person is saved in the particular classes of the sections, wherein the personal information comprises:

(1.a) Basic information appearing in existing identification card such as the name, the birthday, as well as some basic numbers such as social security number, passport records, etc, wherein the class of information can be made available under local laws and upon request from the government.

(1.b) Simple biometrics information that is standard, such as color of hair, eyes, and recent photograph.

(1.c) Simple biometrics information that is less standard, such as iris pattern, fingerprints, and handprints or any other proven forms.

(1.d) Standard biometrics information that is related to the medical or genetic record of the person.

(1.e) DNA fingerprint, sequence profile and other such information of the person.

(1.f) Voice recording of the person of a selection of standard messages.

(1.g) Any other records deem important to the person who wishes to put in.

In the cases of the need of authentic sampling such as Human ID testing, Sampling procedure can also be securely monitored, with the help of the third party such as Notary Public or Attorney; the use of real time internet recording and sending of data for testing. Such security measures can be coupled with door key passes that are provided by a separate security company with internet time monitoring system.

The step (1) further comprises the steps of:

(1-1) Convert the identity file into a standard readable form.

(1-2) Compress the identity file for minimizing a volume thereof

In step (1-1), after the personal information is collected, the identity file is converted into a standard readable file type by an existing multimedia data management, wherein the identity file is then compressed into a compact size thereof, in step (1-2), and stored in a data base system such as computer or ISP server. The advantage of compressing the identity files is that more identity files can be stored in the data base system by reducing its size without corrupting or damaging the personal information inside the identity file.

In step (2), the header PIN number is preset for each section as a reference wherein each header PIN number is combined with five corresponding informative numbers, which are the section identification number, the section confidential number, the data compression number, the file type number, and the section status number The section identification number is a number for distinguishing each section in the identity file, which is assigned based on a random number generator. For example, the range of the section identification number can be fixed to run from 00 to 99, if there are not more than 100 sections in the identity file. Also, alphanumeric characters can also be used if desired by local authorities.

In order to classify the level of confidentiality of the section, a digit is appended onto the section confidential number, For example, when there are three levels of confidentiality, the digit of the section confidential number can be 1, 2, and 3 respectively. If the section is not confidential, the digit 0 is assigned to the section confidential number.

The data compression number indicates a method of data compression, which is chosen from a selection of methods by using a random number generator wherein the data compression number can be an integer.

The file type number indicates what selection of type of the identity file is belonged to, which is generated by using a second random number generator. The file type number is a second integer.

The section status number, which is an integer, denotes the status of the section of the identity file which is the mode of the biometrics information. In other words, each nonzero integer of the section status number denotes one mode of the biometrics information is required in order to open the identity file.

For example, if the section in the identity file is non-confidential, then it is denoted with zero. If the section is confidential, it is given a nonzero integer. To give a simple example, consider that there are only three modes of biometrics information, which are fingerprint, iris pattern and voice recording and are being ordered from 1 to 3, with 1 corresponding to fingerprint, 2 for iris pattern, and 3 for voice recording respectively. When the section header, i.e. the header PIN number, is numbered as 120520 that denotes the section identification number is 12, the section confidential number is 0, the data compression number is 5, the file type number is 2, and the section status number is 0. So, the header PIN number means this is the section 12, the level of confidentiality is 0, the method of compression is 5, the file type is 2, and this is a non-confidential status which does not require any biometrics information. For another example, the section PIN number (the section header) is numbered as 022331 that denotes the section identification number is 02, the section confidential number is 2, the data compression number is 3, the file type number is 3, and the section status number is 1. So, the header PIN number means this is the section 02, the level of confidentiality is 2, the method of compression is 3, the file type is 3, and it is required the fingerprint to open this file.

In step (3), the distinctive section comprises the encrypted data corresponding to the biometrics information used in the authorization process. In the above example, the distinctive section comprises the fingerprints, the iris pattern and voice recording. The distinctive section requires the use of master key encryption technology for its opening wherein the master key is also used as the personal password for the entire identity file. When the distinctive section is opened, one cannot view the information inside, but can compare overlap of information input with the stored information in the distinctive section. Therefore, the distinctive section will be used for verification purpose of biometrics information only.

The step (4) further comprises the step of:

(4-1) Create an identity card number which comprises the master PIN number, a mode of biometrics information for each corresponding section, and a section number.

In step (4), after collecting the entire sections of the identity file with the respective header PIN number thereof, the master PIN number, which comprises an ordering of the section, is provided for the identity card holder wherein the identity card holder is able to use the master PIN number to verify himself/herself and activate the sections in the identity file.

The ordering of the sections is denoted as a section order number which is a sequence of the section number. In other words, for given n sections of the identity file, a sequence of n digits is generated by a random number generator to denote the ordering of the sections. The sequence of n digits of the section order number is partially formed into the master PIN number for the entire identity file, which is needed to be memorized by the identity card holder.

In step (4-1), the mode of biometrics information for each corresponding section is denoted by a sequence of digits of a biometrics mode number which is followed by the section order number in the master PIN number. Furthermore, the section number, which is formed by two digits for the identity file holder to input, denotes which desired section of the identity file that the identity card holder want to be opened up.

For example, there are 5 sections of the entire identity file and are ordered to be 43152 as the section order number, the first section ordering is the fourth section, then the third section, then the first section, then the fifth section and the last section ordering is the second section. Supposing that the section 1 as non-confidential, section 2, 3, and 4 are confidential and require a mode of biometrics information of the fingerprint, the iris pattern and again the fingerprint for the opening of the section respectively, and final section 5 is non-confidential. Then the corresponding biometrics mode is 01210. The identity card number of this identity file is 4315201210. If the section number is input as 03, it means that the identity card holder wants to open up section 3.

One can also use an alternative method for the coding of section order number. The main object of the section order number, which acts as a password, is used to open the identity file as the master key that mentioned above. The master PIN number consists of the following two features: (1) Only the non-confidential section can be opened, i.e. not biometrics information is required to be verified. (2) The distinctive section cannot be opened for viewing the personal information therein, but only for the verification purpose of other confidential sections.

In step (5), the identity card holder is guided to key in his/her master PIN number for the identity file. The identity card holder must input the master PIN number provided in step (4) in order to process the activation of a section and the authorization of opening the identity file.

The step (6) further comprises a step of:

(6-1) Input a section number that the corresponding section of the identity file is desired to be open by the identity card holder.

In step (6), after comparing the inputting PIN number with the master PIN number, if the input master PIN number is correct, then the identity card holder will be authorized to proceed further.

In step (6-1), after matching the master PIN number, the identity card holder is then guided to input the section number with respect to the section that the identity card holder want to open wherein the section number is formed by two digits.

If the desired section does not require any biometrics information to open, wherein the section status number of the header PIN number is denoted as 0 in step (2), the desired section will be opened.

If the desired section requires biometrics information to open, wherein the section status number of the header PIN number is denoted as nonzero in step (2), the corresponding biometrics information is needed to be provided to open the section of the identity file. In the above example in step (4), when section 3 is desired to be opened, the identity card holder must provide his/her iris pattern. When the identity card holder provides the corrected iris pattern that matched the distinctive section of the identity file, section 3 will be opened.

Moreover, information released comprises the opened section files and the file number (header PIN number) of the identity card, which must be different from the master PIN number of the entire identity file. Therefore, there is complete privacy unless there is a release of both the personal files containing the name, photographs etc of the person and the confidential section.

The present invention further comprises a default step of:

(8) Send a distress signal when a distress code is detected.

The identity card holder has the freedom to release his personal identity including his confidential section files by supplying the correct master PIN number as well as the appropriate biometrics information. However, there is always a protection from threatening situation where the person is forced to release all section information, while an emergency signal is sent simultaneously to destined location for help.

In step (8), the distress code is preset by the identity card holder in step (4) wherein the distress code is combined with the master PIN number and a biometrics information such that when the identity card holder input the master PIN number and the respective biometrics information, the distress code is then activated and the distress signal is sent to a destined location such as police station for help.

The distress code is achieved by a particular combination of biometrics information. For example, if the distinctive section is opened under normal situation, i.e., not under threat, then the identity card holder will supply his fingerprints of the thumb and the index finger which are the required biometrics information with respect to the section. On the other hand, if the identity card holder is under threat, how can he/she comply with the threatening party and send a distress signal to a helping party simultaneously? In this situation, the identity card holder can supply the finger print of his thumb which will authorize the opening of the appropriate section by checking the distinctive section, as well as the finger print of his little finger which is the distress code preset by the identity card holder. The particular choice of fingers to be used as the distress code is only known by the identity card holder. As a result, the threatening party will have no way to know whether the distress signal has been sent, because in both cases, the finger print of the thumb already authorize the opening of the appropriate confidential section. The full protection of the information in the identity file is provided by the definition of the corresponding modes of biometrics information for the sections and the memorization of these modes by the identity card holder. In the above example, the biometrics mode must be memorized in additional to the meaning of 1 for fingerprint, 2 for iris pattern and 3 for voice recording. Furthermore, in order to have the ability to send signals for help, a special fingerprint, for example the little fingerprint, must be remembered as a mode for the sending of distress signal.

In order to operate the present invention, the personal information of the identity card holder will be collected in step (1). Next, he will have to choose the mode of biometrics information for verification. For example, he will decide to use fingerprints and iris pattern only. He should also decide the distress mode at the same time. For example, he will use the right thumb and the left thumb for normal opening of confidential section and will use the right thumb and right index finger for the opening of the confidential section for activating the distress code and sending the distress signal for help. The distress code must be memorized in order to prevent the distress signal from being sent unintentionally or disabled while in danger.

Furthermore, the identity card holder will designate which section file will be confidential for setting the master PIN number, and if so, what is the mode of biometrics information required for its opening, so as to preset the biometrics mode number. The biometrics mode number is used as a string of reminder for the mode of biometrics information required for the opening of the confidential section. Outsider will not be able to interpret the mode even if the outsider understands the method of PIN generation.

The present invention is also adapted to operate the secure and authentic sampling for personal bio testing such as blood, urine etc. used for bioassays, including DNA. In the case of forensic or paternal DNA identification, the authenticity of the sample must be absolutely certain. Using the above scheme and the real time Internet communication, the processes of sampling and transportation can be made securely. The identity card holder, who is being tested, can activate his own file at first. The sample taking process is then recorded by video equipped with computer. His personal identity encrypted data (or bar code or fingerprints etc) is placed on the sample for individually identification. If the test must be done in another laboratory, the sampling (video recording process etc) data is immediately transmitted to his personal data file and only the required information is sent to the testing center. The results of the test will be automatically recorded on his data file only with the given encrypted data without revealing his real personal information so that the absolute privacy is ensured. If required, he will then activate his file accordingly for whatever purpose he desires or as required by proper authority upon his cooperation. These procedures will then ensure the authenticity. Preferably, by utilizing the Internet, the process can be done anywhere even the identity card holder is out of his country.

What is claimed is:

1. A method of inputting secure personal information in a personal identity card for a card holder, comprising the steps of:
   (a) collecting a set of personal information from said card holder into an identity file having a plurality of file sections;
   (b) presetting a header PIN (personal identification number) for each of said file sections, wherein said header PIN has a section number as a reference of each of said file sections;
   (c) providing an encryption section for holding a set of encrypted data corresponding to a set of biometrics information of said card holder;
   (d) presetting a master PIN to generate an identity card number which comprises said master PIN, a mode of biometrics information for said encryption section, and said section number, wherein said identity card number is implanted in said personal identity card such that said master PIN is required to be input as an authorization for verifying said card holder to activate of said personal identity card while said section number is input to selectively execute said corresponding file section.

2. The method, as recited in claim 1, wherein, in step (d), said header PIN and said corresponding biometrics information are required to be input for executing said file section when said corresponding file section requires biometrics information to be opened.

3. The method, as recited in claim 2, wherein, in step (b), said header PIN is preset by the steps of:
   (b.1) creating a section identification number for distinguishing each of said file sections;
   (b.2) a section confidential number to identity a level of confidentiality of each of said file sections;
   (b.3) a data compression number indicating a method of data compression;
   (b.4) a file type number indicating a selection of type of said file section
   (b.5) a section status number denoting a status of each of said file section corresponding to said biometrics information; and
   (b.6) combining said section identification number, said section confidential number, said data compression number, said file type number and said section status number to form said header PIN.

4. The method, as recited in claim 3, further comprising a step of setting a distress code in said personal identity card such that when said distress code is input, a distress signal is sent out to a destined location for help.

5. The method, as recited in claim 4, wherein said distress code is combined with said master PIN and a biometrics information of said card holder such that when said master PIN and said respective biometrics information are input, said distress signal is activated to be sent out.

6. The method, as recited in claim 2, further comprising a step of setting a distress code in said personal identity card such that when said distress code is input, a distress signal is sent out to a destined location for help.

7. The method, as recited in claim 6, wherein said distress code is combined with said master PIN and a biometrics information of said card holder such that when said master PIN and said respective biometrics information are input, said distress signal is activated to be sent out.

8. The method, as recited in claim 1, further comprising a step of setting a distress code in said personal identity card such that when said distress code is input, a distress signal is sent out to a destined location for help.

9. The method, as recited in claim 8, wherein said distress code is combined with said master PIN and a biometrics information of said card holder such that when said master PIN and said respective biometrics information are input, said distress signal is activated to be sent out.

10. An authorizing process of verifying a card holder of a personal identity card having a plurality of file sections, comprising the steps of:
    (a) receiving an input PIN (personal identification number) from a user;
    (b) comparing said input PIN with a preset master PIN, wherein when said input PIN matches said master PIN, said user is able to activate of said personal identity card; and
    (c) receiving an input section number and a user's biometrics information by said user to selectively execute said corresponding file section, wherein when said input section number matches with a preset file section number of a header PIN and said user's biometrics information matches with a pre-stored biometrics information of said card holder, said user is verified as said card holder to open said respective file section.

11. The authorizing process, as recited in claim 10, wherein, in step (c), wherein said file section is opened when only said input section number matches with a preset file section number of a header PIN, wherein said file section is preset that said file section does not require respective biometrics information to be opened.

12. The authorizing process, as recited in claim 11, further comprising a step of sending out a distress signal to a destined location for help when said input PIN matches with a preset distress code.

13. The authorizing process, as recited in claim 10, further comprising a step of sending out a distress signal to a destined location for help when said input PIN matches with a preset distress code.

14. A personal identity card for a card holder, having a plurality of file sections wherein each of said file sections for storing personal information of said card holder, wherein a header PIN is preset for each of said file sections and has a section number as a reference of each of said file sections, wherein an encryption is provided for holding a set of encrypted data corresponding to a set of biometrics information of said card holder, wherein a master PIN is preset to generate an identity card number which comprises said master PIN, a mode of biometrics information for said encryption section, and said section number, wherein said identity card number is implanted in said personal identity card such that said master PIN is required to be input as an authorization for verifying said card holder to activate of said personal identity card while said section number is input to selectively execute said corresponding file section, wherein said header PIN and said corresponding biometrics information are required to be input for executing said file section when said corresponding file section requires biometrics information to be opened.

15. The personal identity card, as recited in claim 14, wherein said header PIN comprises a section identification number for distinguishing each of said file sections, a section confidential number to identity a level of confidentiality of each of said file sections, a data compression number indicating a method of data compression, a file type number indicating a selection of type of said file section, and a section status number denoting a status of each of said file section corresponding to said biometrics information.

16. The personal identity card, as recited in claim 15, wherein a distress code is preset in said personal identity card such that when said distress code is input, a distress signal is sent out to a destined location for help.

17. The personal identity card, as recited in claim 16, wherein said distress code is combined with said master PIN and a biometrics information of said card holder such that when said master PIN and said respective biometrics information are input, said distress signal is activated to be sent out.

18. The personal identity card, as recited in claim 14, wherein a distress code is preset in said personal identity card such that when said distress code is input, a distress signal is sent out to a destined location for help.

19. The personal identity card, as recited in claim 18, wherein said distress code is combined with said master PIN and a biometrics information of said card holder such that when said master PIN and said respective biometrics information are input, said distress signal is activated to be sent out.

* * * * *